June 23, 1953  M. H. GOODNER  2,642,701
TWO-STAGE GAS PRESSURE REGULATOR
Filed Dec. 15, 1948  2 Sheets-Sheet 1

*INVENTOR.*
MONROE HARRY GOODNER

BY

ATTORNEYS

June 23, 1953     M. H. GOODNER     2,642,701
TWO-STAGE GAS PRESSURE REGULATOR
Filed Dec. 15, 1948     2 Sheets-Sheet 2
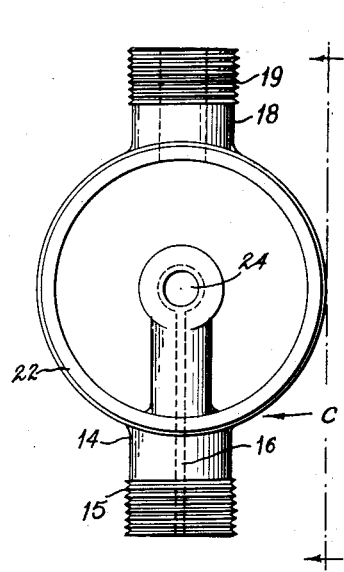
FIG. 2
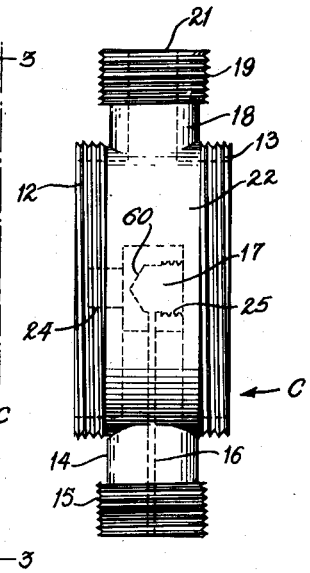
FIG. 3
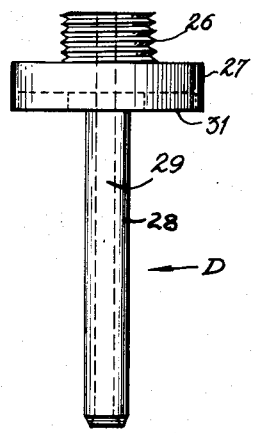
FIG. 4
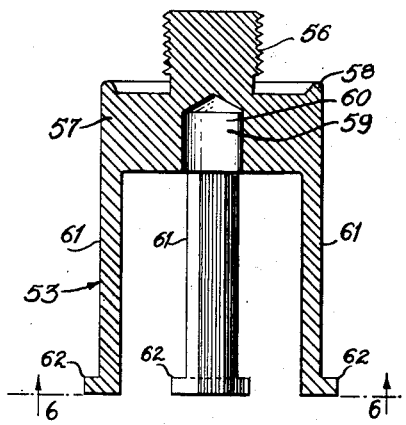
FIG. 5
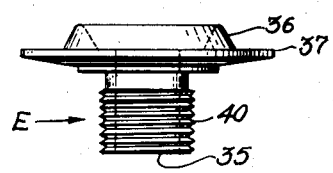
FIG. 7
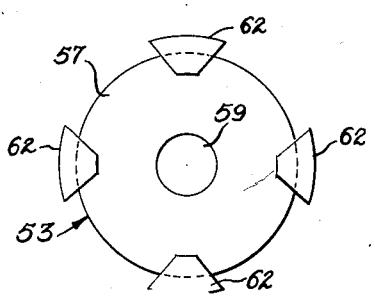
*INVENTOR.*
MONROE HARRY GOODNER
ATTORNEYS Patented June 23, 1953

2,642,701

UNITED STATES PATENT OFFICE 2,642,701

TWO-STAGE GAS PRESSURE REGULATOR

Monroe Harry Goodner, Glendale, Calif., assignor to Stephenson Corporation, Red Bank, N. J., a corporation of New Jersey Application December 15, 1948, Serial No. 65,480

16 Claims. (Cl. 50—10)

This invention relates to a two-stage gas pressure regulator. It is more specifically related to that type of regulator which is used to dispense gas through a valve from a container or reservoir in which the gas is at a relatively high pressure to a device in which the gas is to be used at a relatively low pressure. Heretofore difficulty has been encountered in keeping the outlet pressure of such a regulator at a constant value when the gas is contained in a high pressure container of relatively limited size. In the past, in the use of gas pressure regulators of this general type, it has been found that, as the discharge of the container progressed, the outlet pressure of the gas pressure regulator also decreased. Under such conditions it is not possible to use all of the gas present in the container because the outlet pressure of the gas pressure regulator eventually drops below the minimum pressure required to satisfy the device in which the gas is used. It is obvious that this is true even when the pressure of the gas in the container is substantially higher than that at which it is being used if the ratio of the pressure in the container to the pressure of the outlet of the gas pressure regulator remains substantially constant during discharge of the gas from the container.

It is an object of the present invention to design a two-stage gas pressure regulator wherein the outlet pressure of the regulator is substantially constant regardless of the decrease in pressure of the gas in the container from which the gas is being drawn to a pressure just slightly higher than the outlet pressure. In other words, it is an object of the present invention to design a gas pressure regulator to maintain a substantially constant outlet pressure rather than to maintain a constant ratio between container pressure and gas regulator outlet pressure.

It is a further object of the present invention to provide such a gas pressure regulator which is easy and economical to construct and which has by its design inherent safety in operation.

Various other objects, advantages and features of the invention will become apparent from the following detailed description taken in conjunction with the appended drawings in which:

Fig. 2 is a plan view partially in cross-section of the main body portion of the regulator;

Fig. 3 is a side view on line 3—3 of Fig. 2;

Fig. 4 is a view partially in cross-section of the jet member of the regulator;

Fig. 5 is a cross-sectional view of one of the floating members;

Fig. 6 is a side view on line 6—6 of Fig. 5; and

Fig. 7 is a view partially in cross-section of the valve located between the portion of the regulator containing gas at an intermediate pressure and the portion containing gas at the outlet pressure.

Like reference characters identify like parts throughout the different views of the drawings.

Figure 1:
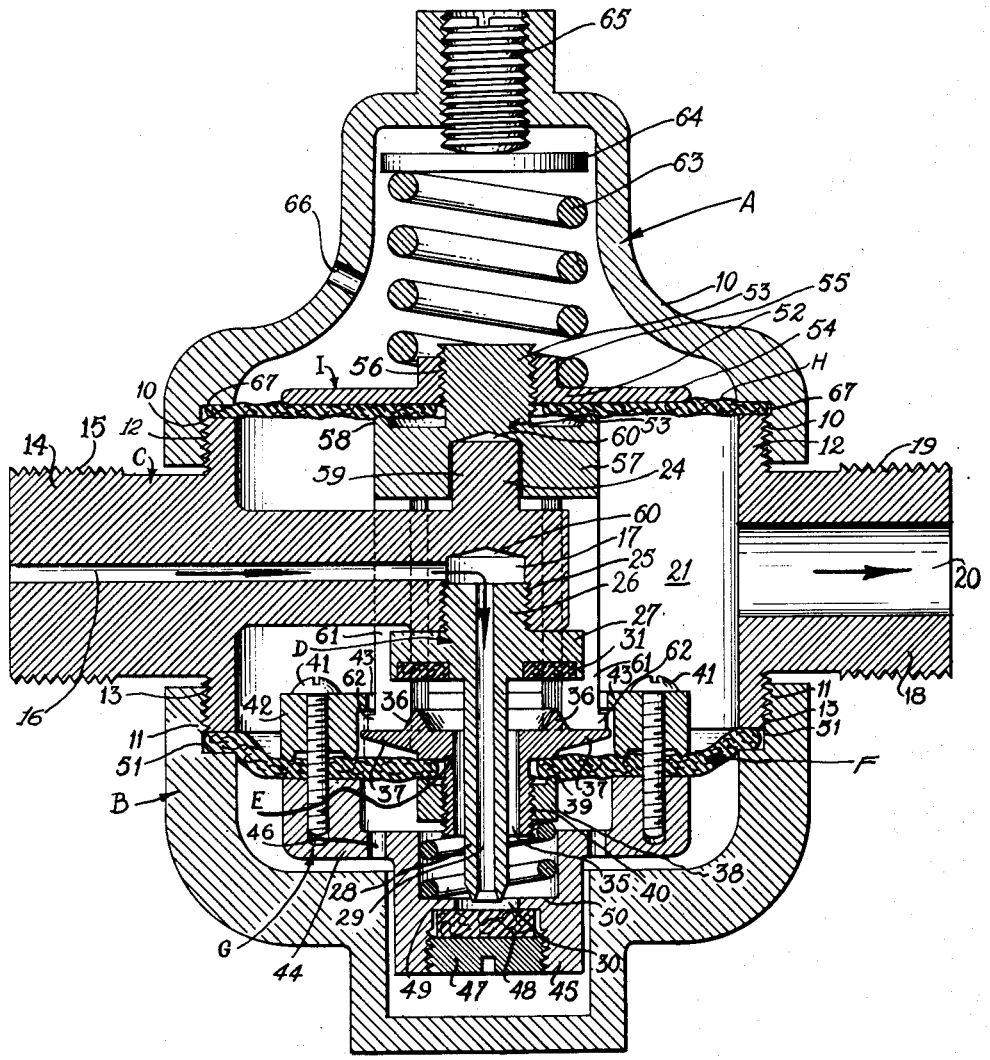
Fig. 1 is a cross-sectional view of a gas pressure regulator embodying the present invention.

The housing of the regulator comprises two portions, an upper housing A and a lower housing B. Each of these housings have internally threaded portions 10 and 11 adapted to engage externally threaded portions 12 and 13 of main body portion C and thereby to hold main body portion C securely in place within the housing. Body portion C has an inlet portion 14 which extends beyond the housing of the regulator and which is externally threaded as shown at 15 so that it may be coupled to a gas container or reservoir or pipe leading therefrom (not shown). Inlet portion 14 is centrally bored to form an inlet passage 16 which extends to a centrally located high pressure chamber 17 formed between main body portion C and other parts of the regulator, as will be more fully described hereinbelow. Main body portion C has at its other end an outlet portion 18 which extends beyond the regulator housing and which is externally threaded as at 19 and can thereby be connected to the device (not shown) in which the gas is to be used. Outlet portion 18 is centrally bored to form an outlet passage 20 which extends into the regulator housing to low pressure chamber 21, the formation of which will be more fully described hereinbelow. Inlet portion 14 and outlet portion 18 are connected by an annular portion 22 (see Fig. 2) upon vertical extension of which threads 12 and 13 are formed.

At the center of main body portion C, there is formed a generally cylindrically shaped boss 24 which extends vertically upward from portion C. The lower part of the central portion of C is counter-bored and internally threaded as shown at 25 to receive a portion 26 of jet member D which is externally threaded to fit the thread in counter-bore 25. High pressure chamber 17 is formed by the space in counter-bore 25 extending above the top of portion 26 of jet member D. Inlet passage 14 terminates in high pressure chamber 17.

As may be seen from Fig. 4, jet member D is provided with a flange portion 27 disposed just below threaded portion 26 below which is a stem portion 28 containing passage 29 extending from high pressure chamber 17 to intermediate pressure chamber 30. Preferably, passage 29 is slightly flared at its exit and stem portion 28 is slightly tapered at its end. When jet member D is inserted in main body portion C the upper face of the flange 27 is held tightly against the lower face of the center part of main body portion C forming a pressure-tight fit. The lower face of flange 27 has an annular counter-bore in which is inserted valve seat washer 31.

The above described parts of the pressure regulator comprise the stationary or non-floating parts. They may be made of any suitable material having the necessary mechanical strength to withstand the pressures for which the regulator is to be used and to resist the chemical effects of any gas to be used in the regulator. The choice of the materials for these parts is no part of the present invention, but materials which have been found suitable are steel, bronze and brass. Valve seat washer 31 may be of any suitable composition material that has some resilience. Neoprene is a very suitable material for valve seat washer 31 since it may be vulcanized into the annular counter-bored groove in flange 27 to hold it firmly in place.

Surrounding stem section 28 of jet member D there is arranged hollow cylindrical valve E. Valve E has a cylindrical opening 35 (see Fig. 7) which is not only large enough to accommodate stem portion 28 of jet member D but forms an annular passage around said stem section for the flow of gas. The seat 36 of valve E is formed as an annular ring on the face of the valve and is of triangular cross-section being wider at its base than at its end forming the closure with valve seat washer 31. Since valve seat washer 31 is made of resilient material, such as neoprene, valve seat 36 can enter it to a slight extent when valve E is completely closed. Valve E is also provided with a flange portion 37 located under and extending radially beyond seat 36. Screw threaded nut 38 having an annular ridge 39 is screwed on threaded portion 40 of valve E and when tightened serves to hold the inner edge of diaphragm F in secure engagement with valve E.

Surrounding valve E and not connected thereto, but firmly connected to diaphragm F, is part G which is constructed in two sections held together by screws 41. Upper section 42 of part G is a ring-like member with holes to accommodate screws 41 and with its central opening having a diameter large enough to accommodate flange portion 37 of valve E and to form around said flange portion an annular passageway for the flow of gas. Internally formed flange at the top of section 42 extends inwardly to form a small annular passageway between it and flange portion 27 of jet member D. The lower section 44 of part G also has an annular section containing threaded holes to receive screws 41 and an internal opening of the same diameter as that of section 42. Lower section 44 of part G has a cylindrically shaped extension 45 of reduced diameter which extends into a well formed in lower housing B provided for that purpose which has an internal diameter slightly greater than the diameter of 45, thus providing a passage for gas between extension 45 and the side walls of the well in lower housing B. One or more openings 46 are drilled in the floor formed between the main part of section 44 and extension 45 to allow passage of gas between the chamber formed around valve E to the space between part G and lower housing B beneath diaphragm F. Extension 45 does not quite reach the inside wall of lower housing B thus providing a space between those two parts forming part of the chamber above-mentioned. The lower end of extension 45 is counter-bored and threaded to receive and firmly hold by plug screw 47 a valve seat 48 against which the tapered end of jet member D will rest when part G is raised as hereinafter described. Valve seat 48 may be made of any suitable material. It should have some degree of resilience but should not be as resilient as valve seat washer 31. Hard rubber or any suitable composition material is suitable. The counter-bore in extension 45 extends upward above valve seat 48 and is of greater internal diameter than the diameter of stem section 28 of jet member D.

A coil spring 49 is inserted to surround the lower end of jet member D and has one end abutting against the lower face of nut 38 on valve E and its other end abutting against an internal shoulder 50 formed in extension 45 of lower section 44. Spring 49 tends to keep the valve formed by the tip of jet member D and valve seat 48 open. It is to be noted that part G is completely floating and its position is determined by the difference in pressure on each side of diaphragm F and the thrust exerted by spring 49.

Diaphragm F is tightly clamped at its outer edge between lower housing B and main body portion C as shown at 51. Holes are provided to receive screws 41 and it is again firmly attached approximately midway of its radius to part G by being held between sections 42 and 44 when screws 41 are tightened. Finally it is provided with a central hole having a diameter slightly less than that of tightening nut 38 and the portion of valve E just below its flange 37 of valve E so that the inner edge of diaphragm F is firmly clamped to valve E by tightening nut 38.

A second diaphragm H is clamped at its outer edge between upper housing A and main body portion C. Attached to this diaphragm near its center is floating assembly I comprising parts 52 and 53. Part 52 has a flange portion 54 of relatively large diameter resting on diaphragm H and an externally threaded collar 55 adapted to screw on a threaded portion 56 of part 53 which extends upward through a suitable opening in diaphragm H.

Part 53, as is more readily shown by reference to Figs. 5 and 6, has the threaded portion 56, above mentioned, below which is a main cylindrical portion 57 of enlarged diameter. A vertically extending annular ridge 58 is formed on the periphery of 57 adapted to press firmly into diaphragm H when part 52 is tightly screwed to part 53. Cylindrical portion 57 is counter-bored axially to form a recess 59 of slightly larger diameter than that of the extension 24 of the center portion of main body portion C and of a length sufficient to form a chamber 60 preferably of conical shape between part 53 and portion C, thus providing a passageway for gas up and around extension 24. Extending below main portion 57 of part 53 and at its periphery, legs 61 are formed having flanged feet 62. Legs 61 extend so that feet 62 normally are just too short to rest on flange 37 on valve E but do so during the operation of the device as will hereinbelow be more fully described.

A coil spring 63 is arranged to have one of its ends fit around collar 55 and abut against flange 54 of part 52. The other end of spring 63 abuts against spring plate 64 located in the upper part of upper housing A and held in place against spring 63 by adjustable screw 65 fitted in the upper part of upper housing A and readily available for adjustment from the outside of said housing. It can now be readily seen that part I comprising parts 52 and 53 is completely floating and its position within the housing is determined by the difference in pressure on the sides of diaphragm H and the thrust exerted upon it by spring 63.

Upper housing A has a vent 66 which maintains the pressure in the space above diaphragm H at atmosphere which is assumed to be lower than the pressure at which the gas is used.

As stated, with relation to the stationary parts, with the exception of diaphragms F and H and valve seat 48, all the parts may be made of any desired metal suitable for the pressures and chemical effect of the gases to be used. As before stated steel, bronze and brass have all been found satisfactory in practice. Diaphragms F and H may be made of any suitable flexible material. As an example, cloth-reinforced neoprene has been successfully used in practice.

*Operation*

Gas received from the container (not shown) passes through inlet passage 16 in main body portion C to high pressure chamber 17, through passage 29 through jet member D to the portion of intermediate pressure chamber 30 which is located directly over valve seat 48 and which surrounds the end of jet member D. Thence it passes through passage 35 formed between jet member D and valve E over valve seat 36 out into low pressure chamber 21 from which it can be drawn off through outlet 20 for use. It is to be noted that if valve E is raised, valve seat 36 closes against valve seat washer 31 and no gas passes to chamber 21. However, gas can fill all of the open spaces within lower housing B that are beneath diaphragm F including those surrounding and under part G since they are connected by opening 46 in that part. Since pressure is reduced as the gas passes through jet member D, this irregularly shaped chamber 30 is designated as the intermediate pressure chamber.

The size and strength of spring 63 is chosen so that, subject to relatively fine adjustments by screw 65, its thrust on diaphragm H, applied through part 53 normally holds part 53 down so that its feet 62 push against flange 37 of valve E and keep that valve open. Valve E will remain open until the pressure is built up in lower pressure chamber 21 sufficiently to overcome the thrust of spring 63 and allow part 53 to rise and consequently valve E to close.

When valve E is closed, it is obvious that the pressure in intermediate pressure chamber 30 will rise with the tendency of diaphragm F to lift part G so that eventually valve seat 48 is pressed against the tip of jet member D cutting off the supply of high pressure gas. Before this occurs, however, the pressure in intermediate chamber 30 must rise sufficiently to overcome the downward pressure of the gas in low pressure chamber 21 on diaphragm F plus the downward thrust of spring 49 against shoulder 50 of part G and the downward pressure of the gas at the mouth of jet member D against valve seat 48. Once valve seat 48 is firmly against jet member D the pressure maintained in intermediate chamber 30 will slightly exceed the sum of the pressures and force of spring 49 mentioned above.

Since gas is being withdrawn through outlet 20, the pressure in low pressure chamber 21, will now tend to drop allowing spring 63 to force part 53 down and in turn opening valve E thus allowing gas to pass from intermediate pressure chamber 30 into low pressure chamber 21. This, in turn, reduces the pressure in intermediate chamber 30 allowing valve seat 48 and jet member D to part thereby opening the valve from high pressure chamber 17.

It is to be observed that diaphragm F actually functions as two diaphragms, one of which is between its outer edge, and part G, anchored to lower housing B at 51, and the other of which is between part G and the inner edge of diaphragm F anchored to valve E. One effect and advantage of this double action of diaphragm F is that, in cooperation with the structure and arrangement of valve E, it makes that valve a balanced valve requiring a minimum of change in pressure to open it or to close it. This may be readily seen since the gas within the area enclosed by annular valve seat 36 which is at intermediate pressure tends to open valve E whereas the gas under the inner portion, from part G to valve E, of diaphragm F also at intermediate pressure tends to close valve E. Thus, force which must be exerted by legs 61 and feet 62 on flange 37 of valve E to open valve E is relatively small. Likewise the increased intermediate pressure when valve E is open which is required to close it is slight.

I claim:

1. In a two-stage gas pressure regulator a two-part housing, a stationary member containing inlet and outlet passages secured to the parts of said housing, a first and a second diaphragm each secured at their edges respectively to one part of said housing by said stationary member, a pressure-reducing jet secured to said stationary member and forming at its juncture with said member a high pressure gas chamber, a floating member including a valve seat supported by said first diaphragm and a spring biased in the same direction as the thrust exerted upon it by the gas discharged from said pressure-reducing jet, an intermediate pressure gas chamber formed in and around said floating member between said pressure-reducing jet, said diaphragm and a portion of one part of said housing, a cylindrical shaped and flanged pressure-reducing valve surrounding said pressure-reducing jet, a valve seat therefor carried on a portion of said pressure-reducing jet, said pressure-reducing valve floating but supported by said first diaphragm, a spring biased floating member supported by said second diaphragm and adapted to transmit its motion to said pressure-reducing valve, a low pressure gas chamber formed between said two diaphragms and a portion of each part of said housing and open to said outlet passage, the space between a portion of one of said housing parts and said second diaphragm being open to atmosphere by an opening in said part of said housing.

2. In a two-stage gas pressure regulator for reducing pressure, a high pressure chamber, an intermediate pressure chamber, a low pressure chamber, a valve separating said intermediate pressure chamber from said low pressure chamber mounted on a flexible diaphragm, said valve having a passage through it for passing gas from said intermediate pressure chamber to said low pressure chamber, means defining a confined space around the outlet of said passage, between it and said low pressure chamber, and on the opposite side of said valve from said intermediate chamber, into which gas from said intermediate chamber is supplied and which tends to balance the pressure exerted on the surface of the valve remote from said outlet by the gas in the intermediate chamber.

3. In a two-stage gas pressure regulator for reducing pressure, a casing, a high pressure chamber, an intermediate pressure chamber, a low pressure chamber, a diaphragm separating said intermediate pressure chamber from said low pressure chamber anchored at its periphery to said casing, a floating member supported by said diaphragm and secured thereto intermediate of the periphery and of the center portion thereof, and a valve supported by said diaphragm and secured thereto at the center portion thereof, said valve having a seat and an area within said seat subjected to said intermediate pressure in one direction proportioned to substantially balance the force exerted on said valve in the opposite direction by pressure against the inner portion of said diaphragm.

4. In a two-stage gas pressure regulator for reducing pressure, a casing, a high pressure chamber, an intermediate pressure chamber, a low pressure chamber, a diaphragm separating said intermediate pressure chamber from said low pressure chamber anchored at its periphery to said casing, a floating member supported by said diaphragm and secured thereto intermediate of the periphery and of the center portion thereof, and a valve supported by said diaphragm and secured thereto at the center portion thereof and by a compression spring interposed between said valve and said floating member, said valve having a seat and an area within said seat subjected to said intermediate pressure in one direction proportioned to substantially balance the forces exerted on said valve in the opposite direction by the pressure against the inner portion of said diaphragm and by said spring.

5. In a gas pressure-reducing regulator in which the gas pressure is reduced in two stages, a casing, inlet means to a high pressure gas chamber, jet pressure-reducing means between said high pressure gas chamber and an intermediate pressure gas chamber, a diaphragm anchored at its periphery to said casing, a floating member supported by said diaphragm and forming a closure for said jet means, and a pressure-reducing valve supported by said diaphragm and by a spring, said valve disposed between said intermediate pressure gas chamber and a low pressure gas chamber and having a surface subjected to gas pressure tending to open said valve and having forces exerted thereon by said diaphragm and said spring tending to close said valve whereby said valve is substantially balanced and is responsive to small changes in pressure differentials.

6. In a gas pressure-reducing regulator in which the gas pressure is reduced in two stages, a casing, inlet means to a high pressure gas chamber, jet pressure-reducing means between said high pressure gas chamber and an intermediate pressure gas chamber, a diaphragm anchored at its periphery to said casing, a floating member supported by said diaphragm and forming a closure for said jet means, a pressure-reducing valve supported by said diaphragm and by a spring, said valve disposed between said intermediate pressure gas chamber and a low pressure gas chamber and having a surface subjected to gas pressure tending to open said valve and having forces exerted thereon by said diaphragm and said spring tending to close said valve whereby said valve is substantially balanced, and spring-biased means for operating said valve controlled by the difference in pressure between said low pressure and atmospheric pressure.

7. In a gas pressure-reducing regulator in which the gas pressure is reduced in two stages, a casing, inlet means to a high pressure gas chamber, jet pressure-reducing means between said high pressure gas chamber and an intermediate pressure gas chamber, a diaphragm anchored at its periphery to said casing, a floating member supported by said diaphragm and forming a closure for said jet means, a pressure-reducing valve supported by said diaphragm and by a spring, said valve disposed between said intermediate pressure gas chamber and a low pressure gas chamber and having a surface subjected to gas pressure tending to open said valve and having forces exerted thereon by said diaphragm and said spring tending to close said valve whereby said valve is substantially balanced, and spring-biased means mounted on a second diaphragm anchored at its periphery to said casing for operating said valve, said means being actuated by the resultant force exerted upon it by the difference between the force of said biasing spring in one direction and the force exerted through said second diaphragm by the excess of said low pressure over atmospheric pressure.

8. A two-stage gas pressure regulator comprising a housing having therein a fixed body portion, a first diaphragm extending across said housing on one side of said fixed body portion, and a first assembly supported on said first diaphragm and movable with the diaphragm toward or away from said fixed body portion, a second diaphragm extending across said housing on the opposite side of said fixed body portion and a second assembly supported on said second diaphragm and movable with it toward or away from said fixed body portion, a high pressure chamber in said fixed body portion, a gas inlet passage leading to said high pressure chamber, a gas passage extending from said high pressure chamber to the space in the housing below said first diaphragm, said space comprising an intermediate pressure chamber, a valve member forming part of said first assembly and movable into position to close said passage from the high pressure chamber, a second member comprising said first assembly, and a gas passage extending through said second member and communicating between said intermediate pressure chamber and the space between said diaphragms which space comprises a low pressure chamber, said second member being movable against said fixed body portion to cut off communication between said intermediate pressure chamber and said low pressure chamber, and means associated with said second assembly for normally holding said second member spaced from said fixed body portion.

9. The device claimed in claim 8 wherein spring means are interposed between said first and second members comprising said first assembly, said spring means acting with pressure in said low pressure chamber to oppose movement of said first assembly to limit flow from said high pressure chamber to said intermediate pressure chamber.

10. The device claimed in claim 8 wherein spring means are provided between the housing and said second diaphragm urging the assembly mounted on said second diaphragm in a direction toward the assembly mounted on said first diaphragm, and adapted upon lowering of the pressure in said low pressure chamber to move the assembly on said second diaphragm sufficiently to move the said second member comprising the assembly on said first diaphragm from contact with said fixed body portion to thus open the gas passage between said intermediate pressure chamber and said low pressure chamber.

11. In a two-stage gas pressure regulator comprising a housing having therein high, low and intermediate pressure chambers, a first movable partition between said intermediate and low pressure chambers, a second movable partition between said low pressure chamber and atmosphere, a first valve between the high and intermediate chambers, and a second valve between the low and intermediate chambers, the structure whereby said second valve is partially balanced comprising, a second valve member floatingly supported on said first partition, a passage through said valve member communicating between said intermediate and low pressure chambers when said valve member is not against its seat, and through which at least a portion of the surface of said valve member which is remote from said intermediate pressure chamber is subject to the pressure of said intermediate chamber at all times, the effect of the pressure of the intermediate chamber directed simultaneously against opposite faces of said valve member tending to maintain said valve member responsive to pressure of said low pressure chamber and to prevent increase or decrease in said low pressure regardless of the extent of variation in pressure in said intermediate chamber.

12. The device claimed in claim 11 in which said second valve member has a rib projecting toward said valve seat and providing a chamber around the outlet of said passage when said valve member is seated, into which the pressure of said intermediate chamber is introduced.

13. In a two-stage gas pressure regulator comprising a housing having therein high, low and intermediate pressure chambers, a first movable partition between said intermediate and low pressure chambers, a second movable partition between said low pressure chamber and atmosphere, a first valve between the high and intermediate chambers, and a second valve between the low and intermediate chambers, the structure whereby said second valve is partially balanced comprising, a conduit interconnecting said high and intermediate chambers, a valve member floatingly supported on said first partition for movement longitudinally of said conduit, and having an opening through which said conduit extends, a fixed valve seat for said valve member, a passage through said valve member, communicating between said intermediate and low pressure chambers when said valve member is not against its seat, through which the face of said valve member which is remote from said intermediate pressure chamber is subject to the pressure of said intermediate chamber at all times, the effect of the pressure of the intermediate chamber directed simultaneously against opposite faces of said valve member tending to maintain said valve member responsive to pressure of said low pressure chamber without permitting increase or decrease in said low pressure regardless of the extent of variation in pressure in said intermediate chamber, and thus preventing climbing of the pressure within said low pressure chamber and the outlet of the device.

14. In a two-stage gas pressure regulator comprising a housing having therein high, low and intermediate pressure chambers, a first movable partition between said intermediate and low pressure chambers, a second movable partition between said low pressure chamber and atmosphere, a manually adjustable first valve between the high and intermediate pressure chambers, and a second valve between the low and intermediate pressure chambers, the structure whereby said second valve is partially balanced comprising, a valve member floatingly supported on said first partition, a passage through said valve member communicating between said intermediate and low pressure chambers when said valve member is not against its seat, and through which at least a portion of the surface of said valve member which is remote from said intermediate pressure chamber is subject to the pressure of said intermediate chamber at all times, the effect of the pressure of the intermediate chamber directed simultaneously against opposite faces of said valve member tending to maintain said valve member responsive to pressure of said low pressure chamber for a given setting of the regulator, and to prevent climbing of the pressure within said low pressure chamber and the outlet of the device regardless of the extent of variation in pressure in said intermediate chamber.

15. In a two-stage gas pressure regulator comprising a housing having high, intermediate and low pressure chambers and conduit means interconnecting said chambers and communicating with outlet and inlet ports, in which the portion of the conduit between high and intermediate pressure chambers comprises a first member of a first valve, and there is a movable wall separating the intermediate and low pressure chambers, another member comprising said first valve floatingly mounted on said movable wall and movable relatively to said first valve member in response to the variations of pressure within said intermediate chamber, a first member of said second valve floatingly supported by said movable wall, and provided with a bore through which said first member of said first valve extends, said first member of said second valve being movable longitudinally of said first member of said first valve and having a passage extending through it and comprising a portion of said conduit interconnecting said intermediate and low pressure chambers, said first member of said first valve having a shoulder forming a second member of said second valve and said first member of said second valve having an endless flange movable into contact with said second member of said second valve to provide a seal between said second valve members and around the discharge end of said passage closing intercommunication between said intermediate and low pressure chambers, and means tending to move the said first member of said second valve into open position in opposition to the pressure of said low pressure chamber, and other means tending to close said first member of said second valve in opposition to the differential of the pressures in said intermediate and low pressure chambers.

16. A two-stage regulator comprising high, low and intermediate pressure chambers and conduit means interconnecting between an inlet and said high pressure chamber, said high pressure chamber and said intermediate pressure chamber, and said intermediate pressure chamber and said low pressure chamber, and said low pressure chamber and said outlet, a first valve means between said high pressure chamber and said intermediate pressure chamber, a second valve means between said intermediate pressure chamber and said low pressure chamber, flexible means for floatingly mounting said second valve means, said flexible means and second valve means being acted upon in opposite directions by the pressure of said intermediate pressure chamber, other flexible mounting means for said first valve means, said other mounting means, being biased against the excess of pressure in said intermediate chamber over the pressure in said low pressure chamber, and means actuated upon the closing of said second valve to cause closing of said first valve member thereby cutting off flow from said high pressure chamber to said intermediate pressure chamber.

MONROE HARRY GOODNER.

References Cited in the file of this patent

UNITED STATES PATENTS

| Number | Name | Date |
| --- | --- | --- |
| 1,842,236 | Bastian | Jan. 19, 1932 |
| 2,002,884 | Deming | May 28, 1935 |
| 2,160,849 | Fausek | June 6, 1939 |